US012756989B2

(12) United States Patent
Finley

(10) Patent No.: US 12,756,989 B2
(45) Date of Patent: Oct. 6, 2026

(54) TECHNOLOGIES FOR ACTIVITY MONITORING OF TRANSPORTATION NETWORK COMPANIES WITHIN A GEOFENCE

(71) Applicant: GateKeeper Systems, Inc., Eagan, MN (US)

(72) Inventor: Jonathan D. Finley, Eagan, MN (US)

( * ) Notice: Subject to any disclaimer, the term of this patent is extended or adjusted under 35 U.S.C. 154(b) by 468 days.

(21) Appl. No.: 17/507,197

(22) Filed: Oct. 21, 2021

(65) Prior Publication Data

US 2022/0124460 A1 Apr. 21, 2022

Related U.S. Application Data

(60) Provisional application No. 63/094,476, filed on Oct. 21, 2020.

(51) Int. Cl.

| | |
|---|---|
| ***H04W 4/029*** | (2018.01) |
| ***G06F 3/14*** | (2006.01) |
| ***G06F 16/2455*** | (2019.01) |
| ***H04W 4/42*** | (2018.01) |

(52) U.S. Cl.

CPC .............. *H04W 4/029* (2018.02); *G06F 3/14* (2013.01); *G06F 16/2455* (2019.01); *H04W 4/42* (2018.02)

(58) Field of Classification Search

CPC ....... H04W 4/029; H04W 4/42; H04W 4/021; G06F 3/14; G06F 16/2455; G06Q 50/40

See application file for complete search history.

(56) References Cited

U.S. PATENT DOCUMENTS

| | | | |
|---|---|---|---|
| 5,970,481 | A | 10/1999 | Westerlage et al. |
| 7,905,056 | B2 | 3/2011 | Kornfield |
| 8,768,755 | B2 | 7/2014 | Hedley |
| 9,286,733 | B2 | 3/2016 | Muirbrook et al. |
| 10,339,724 | B2 | 7/2019 | Davidson |
| 10,535,021 | B2 | 1/2020 | Law et al. |

(Continued)

FOREIGN PATENT DOCUMENTS

| | | |
|---|---|---|
| AU | 2007201029 B2 | 9/2007 |
| AU | 2013203727 B2 | 6/2014 |

(Continued)

OTHER PUBLICATIONS

Kristin Vanderhey Shaw; John Wayne Airport Considers Software to Track Fee Payment from Ride-Sharing Vehicles; Jan.-Feb. 2016; 8 pages.

(Continued)

*Primary Examiner* — Umair Ahsan

(74) *Attorney, Agent, or Firm* — Daniel A. Rosenberg; Taft Stettinius & Hollister, LLP

(57) ABSTRACT

A method of monitoring of transportation network company vehicles within a geofence associated with an airport according to one embodiment includes receiving a user selection of a past time interval and an event type within the geofence to be monitored, querying a database for event data that matches the user selection of the past time interval and the event type, generating a JSON object that includes spatial data for each event identified as a result of querying the database, and animating a visual representation of the spatial data for each event in a map view over a timeline associated with the past time interval (e.g., as a video replay).

33 Claims, 6 Drawing Sheets

(56) References Cited

U.S. PATENT DOCUMENTS

| | | | | |
|---|---|---|---|---|
| 2010/0201505 | A1 | 8/2010 | Honary et al. | |
| 2012/0226390 | A1* | 9/2012 | Adams | G07C 5/008 701/1 |
| 2012/0226391 | A1* | 9/2012 | Fryer | G01C 21/3407 701/1 |
| 2012/0253892 | A1* | 10/2012 | Davidson | G06Q 10/0631 705/7.42 |
| 2013/0018705 | A1 | 1/2013 | Heath et al. | |
| 2013/0031029 | A1 | 1/2013 | Davidson | |
| 2015/0271290 | A1 | 9/2015 | Tao et al. | |
| 2016/0110836 | A1 | 4/2016 | Garg et al. | |
| 2016/0203651 | A1 | 7/2016 | Heath et al. | |
| 2019/0007511 | A1* | 1/2019 | Rodriguez | H04L 67/55 |
| 2019/0228654 | A1* | 7/2019 | Olsen | G08G 1/096716 |
| 2020/0143298 | A1* | 5/2020 | Law | G06Q 10/06 |

FOREIGN PATENT DOCUMENTS

| | | | |
|---|---|---|---|
| CA | 2261370 | A1 | 8/2000 |
| CN | 200959131 | Y | 10/2007 |
| CN | 105005839 | A * | 10/2015 |
| CN | 105721482 | A * | 6/2016 |
| FR | 2969357 | B1 | 6/2013 |
| GB | 2407192 | B | 3/2007 |
| JP | 200330701 | A | 1/2003 |
| WO | 2007022154 | A2 | 2/2007 |
| WO | 2011137251 | A1 | 11/2011 |

OTHER PUBLICATIONS

AAAE 2012 Annual Conference & Exposition; GateKeeper Systems, Inc.; Apr. 29-May 2, 2012; Phoenix, Arizona; 16 pages.

* cited by examiner

600

```
POST / HTTPS/1.1
Content-Type: application/json
Authorization: Basic QWxhZGRpbjpvcGVuIHNlc2FtZQ==
Content-Length: 208
```

FIG. 6

700

```
{"uid": "62268341a", "timestamp": "2015-03-24T16:29:29Z", "lon": -122.39938,
"license_plate": "7EOY869", "ride_count": 1, "tnc_id": 32513, "lat":
37.6327, "txn_type": "ENTRY", "geofence_id": "ABC123"}
```

FIG. 7

TECHNOLOGIES FOR ACTIVITY MONITORING OF TRANSPORTATION NETWORK COMPANIES WITHIN A GEOFENCE

CROSS-REFERENCE TO RELATED APPLICATIONS

This application claims priority to and the benefit of U.S. Provisional Application No. 63/094,476, titled "Technologies for Activity Monitoring of Transportation Network Companies within a Geofence," filed on Oct. 21, 2020, the contents of which are incorporated herein by reference in their entirety.

BACKGROUND

Transportation Network Companies (TNCs) continue to play an increasing role in the commercial transportation of people as an alternative to traditional commercial ground transports (e.g., taxis, limousines, buses, shuttles, etc.). In particular, the utilization of TNCs at airports and other transportation-regulated environments has also rapidly increased. Given their nature, TNC integration into the existing physical and regulatory environments of airports, for example, has posed unique challenges.

SUMMARY

One embodiment is directed to a unique system and methods for activity monitoring of transportation network companies within a geofence. Other embodiments are directed to apparatuses, systems, devices, hardware, methods, and combinations thereof for activity monitoring of transportation network companies within a geofence.

According to an embodiment, a method of monitoring of transportation network company vehicles within a geofence associated with an airport includes receiving a user selection of a past time interval and an event type within the geofence to be monitored, querying a database for event data that matches the user selection of the past time interval and the event type, generating a JSON object that includes spatial data for each event identified as a result of querying the database, and animating a visual representation of the spatial data for each event in a map view over a timeline associated with the past time interval.

In some embodiments, receiving the user selection of the past time interval and the event type within the geofence to be monitored may include receiving the user selection of a past time interval and a plurality of event types within the geofence to be monitored, querying the database for event data that matches the user selection of the past time interval and the event type may include querying the database for event data that matches the user selection of the past time interval and at least one of the plurality of event types.

In some embodiments, the event data may indicate that a vehicle is currently on premises within the geofence.

In some embodiments, the past time interval may be a single point in time.

In some embodiments, the visual representation may include a video that displays the spatial data for each event in the map view over the timeline.

In some embodiments, the method may further include monitoring for events associated with a transportation network company vehicle, and generating an alert message in response to identifying one or more events associated with the transportation network company vehicle being on premises within the geofence.

In some embodiments, the method may further include monitoring a geographical location of a transportation network company vehicle within the geofence, and generating an alert message in response to determine that the transportation network company vehicle has remained in the same geographical location for at least a threshold period of time.

In some embodiments, the event type may include one of an entry event, an exit event, a pickup event, or a drop-off event.

According to another embodiment, a system for activity monitoring of transportation network company vehicles within a geofence associated with an airport may include at least one processor and at least one memory having a plurality of instructions stored thereon that, in response to execution by the at least one processor, causes the system to receive a user selection of a past time interval and an event type within the geofence to be monitored, query a database for event data that matches the user selection of the past time interval and the event type, generate a JSON object that includes spatial data for each event identified as a result of querying the database, and animate a visual representation of the spatial data for each event in a map view over a timeline associated with the past time interval.

In some embodiments, to receive the user selection of the past time interval and the event type within the geofence to be monitored may include to receive the user selection of a past time interval and a plurality of event types within the geofence to be monitored, and to query the database for event data that matches the user selection of the past time interval and the event type may include to query the database for event data that matches the user selection of the past time interval and at least one of the plurality of event types.

In some embodiments, the event data may indicate that a vehicle is currently on premises within the geofence.

In some embodiments, the past time interval may be a single point in time.

In some embodiments, the visual representation may include a video that displays the spatial data for each event in the map view over the timeline.

In some embodiments, the plurality of instructions may further cause the system to monitor for events associated with a transportation network company vehicle, and generate an alert message in response to identifying one or more events associated with the transportation network company vehicle being on premises within the geofence.

In some embodiments, the plurality of instructions may further cause the system to monitor a geographical location of a transportation network company vehicle within the geofence, and generate an alert message in response to determine that the transportation network company vehicle has remained in the same geographical location for at least a threshold period of time.

In some embodiments, the event type may include one of an entry event, an exit event, a pickup event, or a drop-off event.

According to yet another embodiment one or more non-transitory machine-readable storage medium comprising a plurality of instructions stored thereon that, in response to execution by at least one processor, may cause a system to receive a user selection of a past time interval and an event type within a geofence associated with an airport to be monitored, query a database for event data that matches the user selection of the past time interval and the event type, generate a JSON object that includes spatial data for each event identified as a result of querying the database, and animate a visual representation of the spatial data for each event in a map view over a timeline associated with the past time interval.

In some embodiments, to receive the user selection of the past time interval and the event type within the geofence to be monitored may include to receive the user selection of a past time interval and a plurality of event types within the geofence to be monitored, and to query the database for event data that matches the user selection of the past time interval and the event type may include to query the database for event data that matches the user selection of the past time interval and at least one of the plurality of event types.

In some embodiments, the event data may indicate that a vehicle is currently on premises within the geofence.

In some embodiments, the event type may include one of an entry event, an exit event, a pickup event, or a drop-off event.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIG. 6 is at least one embodiment of the request header of an example JSON data packet; and FIG. 7 is at least one embodiment of the body of an example JSON data packet.

DETAILED DESCRIPTION

Figure 1:
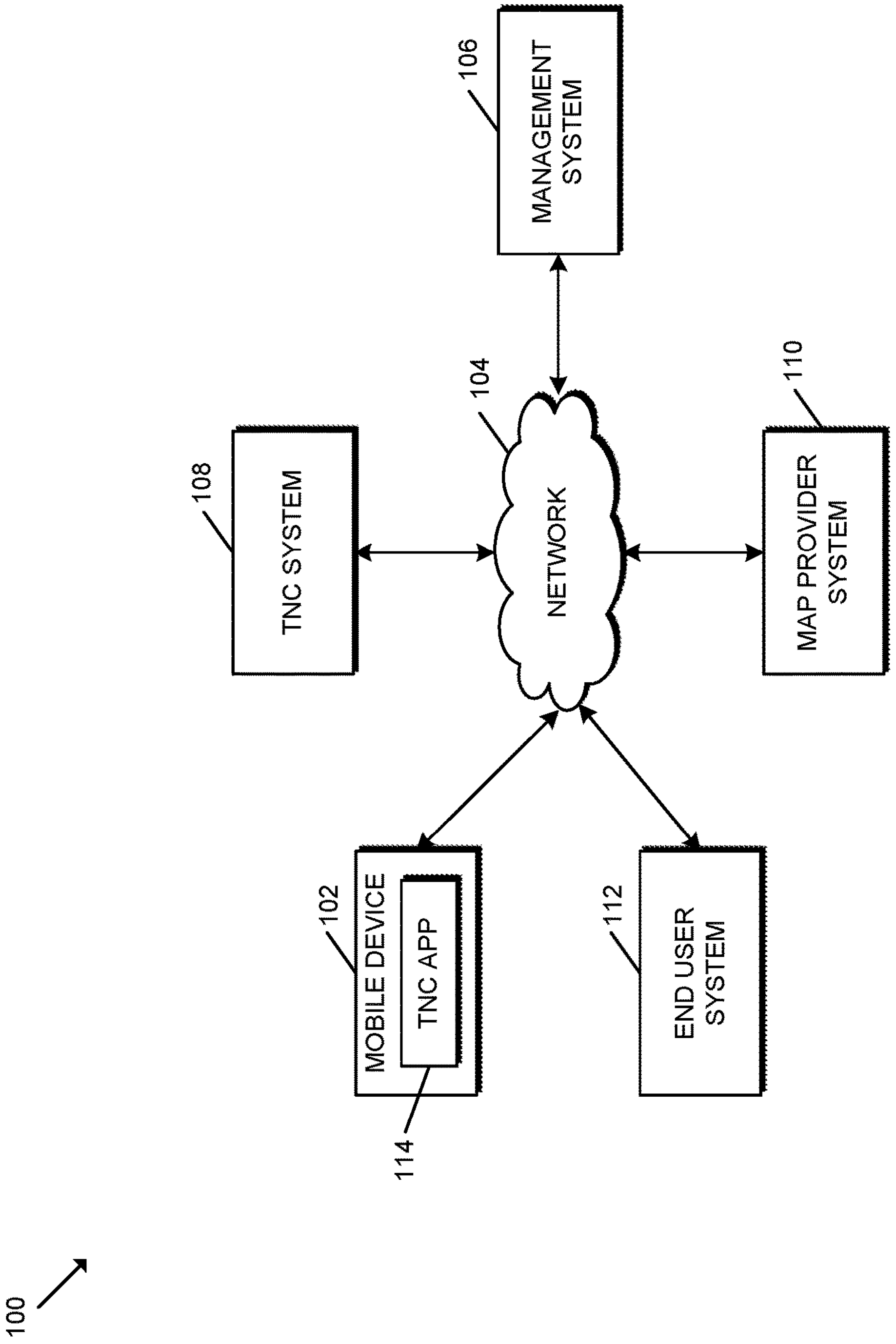
FIG. 1 is a simplified block diagram of at least one embodiment of a system for activity monitoring of transportation network companies within a geofence.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, the illustrative system 100 for activity monitoring of transportation network companies (TNCs) within a geofence includes a mobile device 102, a network 104, a management system 106, a TNC system 108, a map provider system 110, and an end user system 112. It should be appreciated that each of the mobile device 102, the network 104, the management system 106, the TNC system 108, the map provider system 110, and the end user system 112 may be embodied as any type of device or collection of devices suitable for performing the functions described herein.

In some embodiments, the mobile device 102 may be embodied as a desktop computer, laptop computer, tablet computer, or smartphone configured to allow a user (e.g., a TNC operator) to execute one or more TNC applications 114 stored thereon to communicate with the TNC system 108 and/or mobile devices of potential passengers in order to offer and provide TNC services to such passengers. It should be appreciated that each of the applications 114 executed by the mobile device 102 may be embodied as any type of application suitable for performing the functions described herein. In some embodiments, one or more of the applications 114 may be embodied as a mobile application (e.g., a smartphone application), a cloud-based application, a web application, a thin-client application, an application plug-in, and applet, and/or another type of application. For example, in some embodiments, one or more of the applications 114 may serve as a client-side user interface (e.g., via a web browser or local interface) for a web-based application or service (e.g., of the TNC system 108 and/or another computing device). It should be appreciated that, depending on the particular embodiment, the mobile device 102 may execute a single application 114 or separate applications 114 in order to bring about the various functionality described herein.

The network 104 may be embodied as any type of communication network capable of facilitating communication between the various devices of the system 100 (e.g., mobile device 102, the management system 106, the TNC system 108, the map provider system 110, and/or the end user system 112). As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), ad hoc networks, short-range communication links, or a combination thereof. It should be appreciated that, in some embodiments, the various devices/components of the system 100 may communicate with one another via different networks 104. Further, in some embodiments, some of the devices/components of the system 100 may not communicate with one another at all (e.g., the end user system 112 and the mobile device 102).

The management system 106 may be embodied as any type of device configured to receive and process activity data from the TNC system 108, communicate with the map provider system 110 to request/receive map data (e.g., in real-time), and/or otherwise perform the functions described herein.

The TNC system 108 may be embodied as any type of device configured to communicate with the mobile device 102 (e.g., via the TNC application 114) in order to exchange various data associated with the TNC operations, receive data indicative of a geographical location of the mobile device 102 at a given point in time, receive indications that the mobile device 102 has crossed a geofence associated with an airport or other geographically defined area, and/or otherwise perform the functions described herein.

The map provider system 110 may be embodied as any type of device configured to receive requests for maps and/or map data depicting the real-time, historical, and/or other representation of the geographical location of the mobile device 102 and/or another device or entity over time, generate such a map or map data, transmit the map or map data to the end user system 112 and/or other device of the system 100 for display, and/or otherwise perform the functions described herein.

The end user system 112 may be embodied as a desktop computer, laptop computer, tablet computer, server, and/or other type of computing device configured allow an administrative user of the airport or other restricted area to communicate with the management system 106 in order to request various activity data, maps indicative of the real-time or historical location of TNC operators within a geofenced area, and/or otherwise perform the functions described herein. It should be appreciated that the terms "TNC vehicle" and "TNC operator" may be used herein interchangeably. Further, although the system 100 may involve the tracking of a particular TNC operator's mobile device 102, the system 100 may be described herein as tracking the TNC vehicle and/or operator for simplicity.

Although each of the management system 106, the TNC system 108, and the map provider system 110 is described herein as one or more computing devices/systems outside of a cloud computing environment, in other embodiments, the management system 106, the TNC system 108, and/or the map provider system 110 may be embodied as a cloud-based device or collection of devices. Further, in cloud-based embodiments, one or more of the management system 106, the TNC system 108, and/or the map provider system 110 may be embodied as a server-ambiguous computing solution, for example, that executes a plurality of instructions on-demand, contains logic to execute instructions only when prompted by a particular activity/trigger, and does not consume computing resources when not in use. That is, the management system 106, the TNC system 108, and/or the map provider system 110 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the management system 106, the TNC system 108, and/or the map provider system 110 described herein. For example, when an event occurs (e.g., data is transferred to the management system 106, the TNC system 108, and/or the map provider system 110 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user/process (e.g., via an appropriate interface to the management system 106, the TNC system 108, and/or the map provider system 110), the appropriate virtual function(s) may be executed to perform the actions before eliminating the instance of the virtual function(s).

It should be appreciated that each of the mobile device 102, the management system 106, the TNC system 108, the map provider system 110, and/or the end user system 112 may be embodied as one or more computing devices similar to the computing device 300 described below in reference to FIG. 3. For example, in the illustrative embodiment, each of the mobile device 102, the management system 106, the TNC system 108, the map provider system 110, and the end user system 112 includes a processing device 302 and a memory 306 having stored thereon operating logic 308 for execution by the processing device 302 for operation of the corresponding device/system. Although only one mobile device 102, one management system 106, one TNC system 108, one map provider system 110, and one end user system 112 are shown in the illustrative embodiment of FIG. 1, the system may include multiple mobile devices 102, management systems 106, TNC systems 108, map provider systems 110, and/or end user systems 112 in other embodiments. For example, in the illustrative, the same management system 106 may be configured to communicate with multiple TNC systems 108 (e.g., associated with different TNCs), and/or the same TNC system 108 may be configured to communicate with multiple mobile devices 102 (e.g., associated with different TNC operators).

Figure 2:
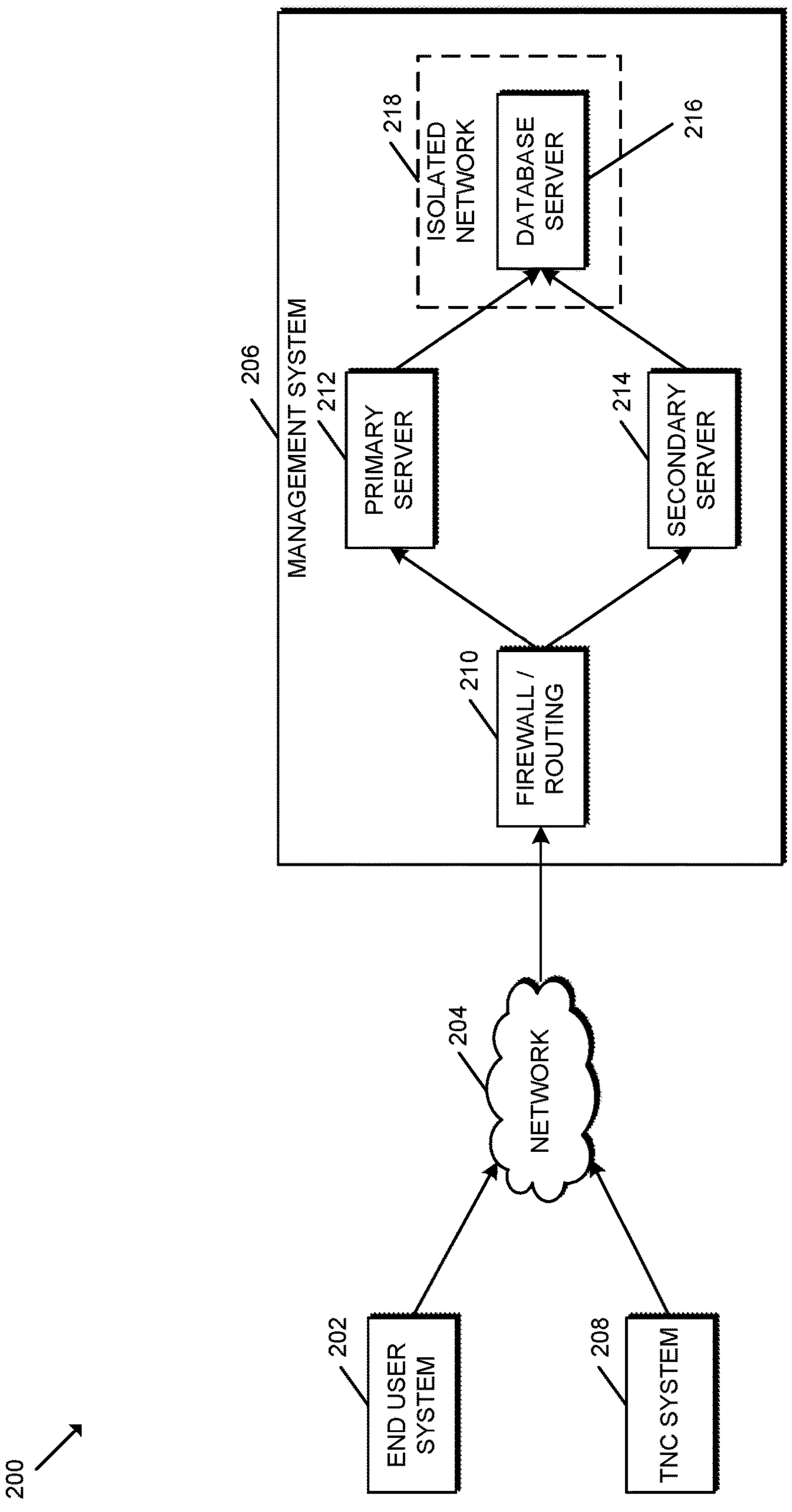
FIG. 2 is a simplified block diagram of at least one embodiment of the system of FIG. 1 for activity monitoring of transportation network companies within a geofence.

Referring now to FIG. 2, the illustrative system 100 for activity monitoring of TNCs within a geofence includes an end user system 202, a network 204, a management system 206, and a TNC system 208. Additionally, the illustrative management system 206 includes a firewall and routing system 210, a primary server 212, a secondary server 214, and a database server 216. It should be appreciated that each of the end user system 202, the network 204, the management system 206, the TNC system 208, the firewall and routing system 210, the primary server 212, the secondary server 214, and the database server 216 may be embodied as any type of device or collection of devices suitable for performing the functions described herein. Further, in some embodiments, the system 200 of FIG. 2 may be embodied as an embodiment of the system 100 of FIG. 1. As such, the descriptions of the various components of the system 100 of FIG. 1 may be equally applicable to the various components of the system 200 of FIG. 2, and the descriptions of those components have not been repeated herein in full for brevity of the disclosure.

As shown in embodiment of FIG. 2, the end user (e.g., an airport administrative user) may use the end user system 202 to access data stored on the management system 206 and/or to otherwise interact with the management system 206. For example, in some embodiments, the end user system 202 may interact with the management system 206 via a website link and a suitable API (e.g., RESTful API). Further, in some embodiments, the end user system 202 may communicate with the primary server 212 and/or the secondary server 214 via the firewall and routing system 210 of the management system 206, which may serve to perform load balance management and/or other firewall and routing functions. As described above, in some embodiments, the management system 206 may be embodied as a cloud-based system, in which case the firewall and routing system 210 may be embodied, for example, as a virtual cloud air firewall and routing system.

In some embodiments, each of the primary server 212 and the secondary server 214 may be embodied as web-application servers to support, for example, TNC-related services, websites, and/or data exchanges. Further, in some embodiments, the secondary server 214 may be used in a load balance setup and/or serve as a backup for data services in the event of an outage of the primary server 212. Although the primary server 212 and the secondary server 214 are described in the singular, it should be appreciated that each of the primary server 212 and/or the secondary server 214 may include multiple servers in some embodiments.

In the illustrative embodiment, the database server 216 is situated within an isolated network 218 and configured to communicate with the primary server 212 and the secondary server 214. Accordingly, in some embodiments, the database server 216 is configured to communicate with only those servers 212, 214 and/or otherwise configured to communicate only with devices within the isolated network 218 or more generally within the management system 206. In the illustrative embodiment, the database server 216 is configured to store the various activity data, user information, and/or other data relevant to activity monitoring of TNCs as described herein.

It should be appreciated that each of the end user system 202, the management system 206, the TNC system 208, the firewall and routing system 210, the primary server 212, the secondary server 214, and the database server 216 may be embodied as one or more computing devices similar to the computing device 300 described below in reference to FIG. 3. For example, in the illustrative embodiment, each of the end user system 202, the management system 206, the TNC system 208, the firewall and routing system 210, the primary server 212, the secondary server 214, and the database server 216 includes a processing device 302 and a memory 306 having stored thereon operating logic 308 for execution by the processing device 302 for operation of the corresponding device/system. Although only one end user system 202, one management system 206, one TNC system 208, one firewall and routing system 210, one primary server 212, one secondary server 214, and one database server 216 are shown in the illustrative embodiment of FIG. 2, the system may include multiple end user systems 202, management systems 206, TNC systems 208, firewall and routing systems 210, primary servers 212, secondary servers 214, and/or database servers 216 in other embodiments.

Figure 3:
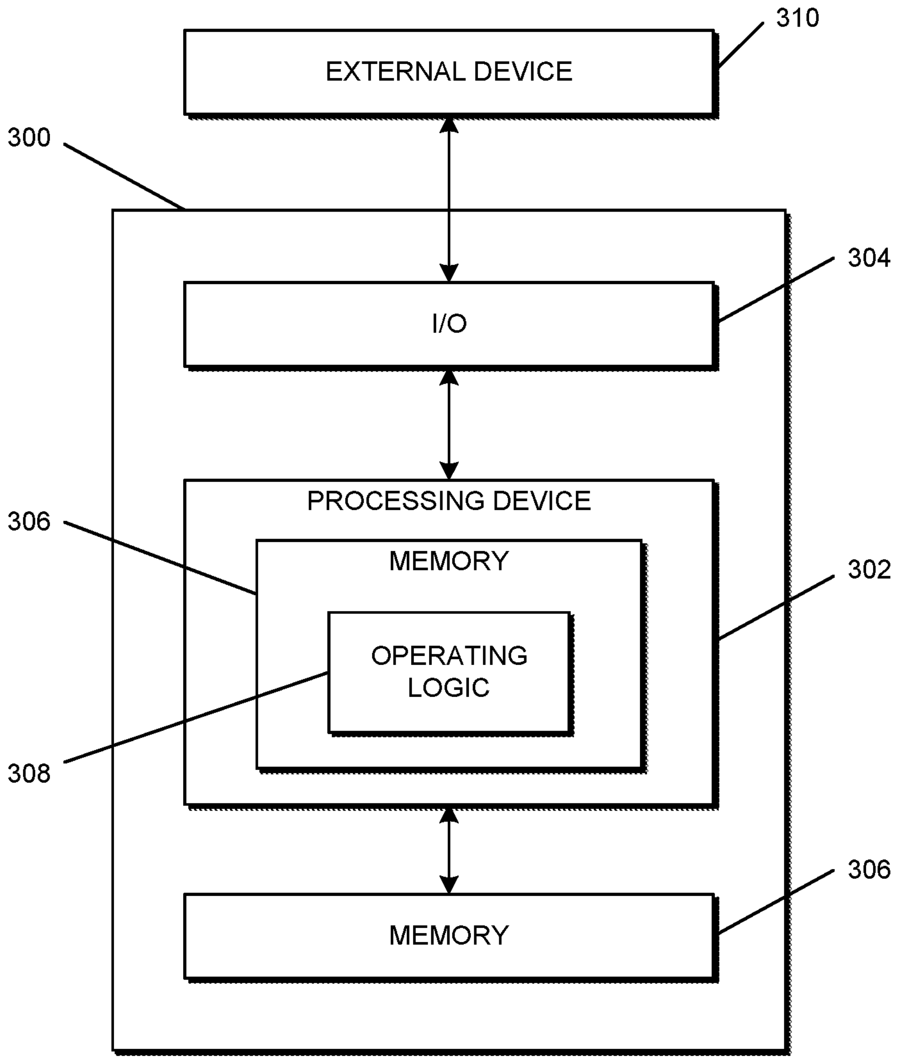
FIG. 3 is a simplified block diagram of at least one embodiment of a computing system.

Referring now to FIG. 3, a simplified block diagram of at least one embodiment of a computing device 300 is shown. In some embodiments, the illustrative computing device 300 depicts at least one embodiment of the mobile device 102, the management system 106, the TNC system 108, the map provider system 110, and/or the end user system 112 illustrated in FIG. 1 and/or one or more devices thereof. Further, in some embodiments, the illustrative computing device 300 depicts at least one embodiment of the end user system 202, the network 204, the management system 206, the TNC system 208, the firewall and routing system 210, the primary server 212, the secondary server 214, and/or the database server 216 illustrated in FIG. 2 and/or one or more devices thereof. Depending on the particular embodiment, the computing device 300 may be embodied as a desktop computer, laptop computer, tablet computer, notebook, netbook, Ultrabook™, mobile computing device, cellular phone, smartphone, wearable computing device, server, personal digital assistant, Internet of Things (IoT) device, processing system, gateway, and/or any other computing, processing, and/or communication device capable of performing the functions described herein.

The computing device 300 includes a processing device 302 that executes algorithms and/or processes data in accordance with operating logic 308, an input/output device 304 that enables communication between the computing device 300 and one or more external devices 310, and memory 306 which stores, for example, data received from the external device 310 via the input/output device 304.

The input/output device 304 allows the computing device 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 300 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 300. The input/output device 304 may include hardware, software, and/or firmware suitable for performing the techniques described herein.

The external device 310 may be any type of device that allows data to be inputted or outputted from the computing device 300. For example, in various embodiments, the external device 310 may be embodied as the mobile device 102, the management system 106, the TNC system 108, the map provider system 110, the end user system 112, the end user system 202, the network 204, the management system 206, the TNC system 208, the firewall and routing system 210, the primary server 212, the secondary server 214, and/or the database server 216. Further, in some embodiments, the external device 310 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 310 may be integrated into the computing device 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is programmable and executes algorithms and/or processes data in accordance with operating logic 308 as defined by programming instructions (such as software or firmware) stored in memory 306. Additionally or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable type, such as a disk, tape, memory stick, cartridge, and/or other suitable portable memory. In operation, the memory 306 may store various data and software used during operation of the computing device 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As shown in FIG. 3, the memory 306 may be included with the processing device 302 and/or coupled to the processing device 302 depending on the particular embodiment. For example, in some embodiments, the processing device 302, the memory 306, and/or other components of the computing device 300 may form a portion of a system-on-a-chip (SoC) and be incorporated on a single integrated circuit chip.

In some embodiments, various components of the computing device 300 (e.g., the processing device 302 and the memory 306) may be communicatively coupled via an input/output subsystem, which may be embodied as circuitry and/or components to facilitate input/output operations with the processing device 302, the memory 306, and other components of the computing device 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 300 may include other or additional components, such as those commonly found in a typical computing device (e.g., various input/output devices and/or other components), in other embodiments. It should be further appreciated that one or more of the components of the computing device 300 described herein may be distributed across multiple computing devices. In other words, the techniques described herein may be employed by a computing system that includes one or more computing devices. Additionally, although only a single processing device 302, I/O device 304, and memory 306 are illustratively shown in FIG. 3, it should be appreciated that a particular computing device 300 may include multiple processing devices 302, I/O devices 304, and/or memories 306 in other embodiments. Further, in some embodiments, more than one external device 310 may be in communication with the computing device 300.

Figure 4:
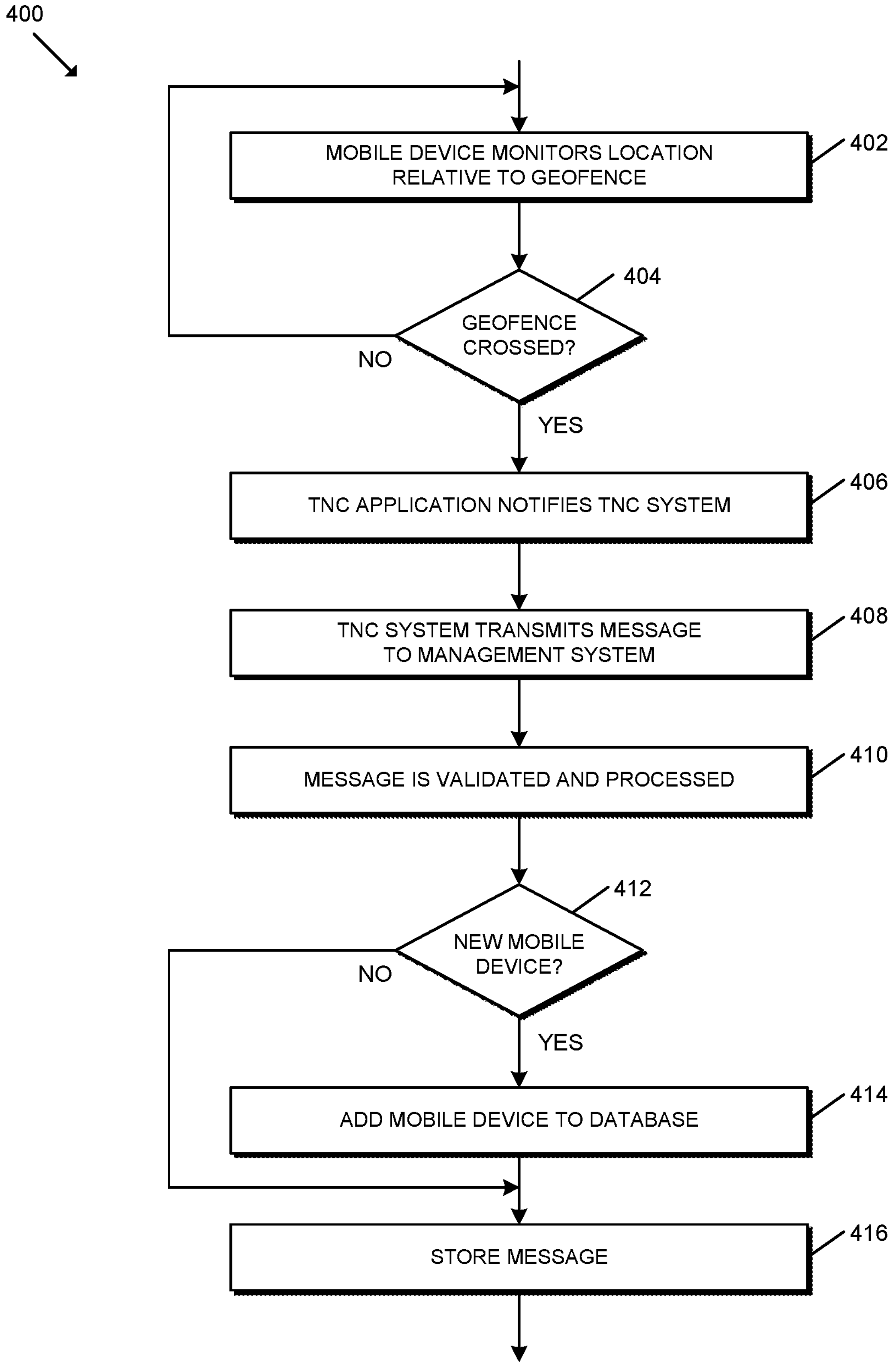
FIG. 4 is a simplified flow diagram of at least one embodiment of a method for receiving data from a transportation network company.

Referring now to FIG. 4, the system 100 may execute a method 400 for receiving data from a transportation network company. It should be appreciated that the particular blocks of the method 400 are illustrated by way of example, and such blocks may be combined or divided, added or removed, and/or reordered in whole or in part depending on the particular embodiment, unless stated to the contrary.

The illustrative method 400 begins with block 402 in which the mobile device 102 monitors its location relative to a geofence defined by or otherwise associated with an airport or other restricted area. For example, in the illustrative embodiment, the mobile device 102 may include global positioning system (GPS) circuitry and/or other geolocation sensors/circuitry that may be used to ascertain a real-time location of the mobile device 102 at any given point in time. Further, the mobile device 102 may have stored thereon geofence data that indicates the location of a geofence associated with the airport or other restricted area. It should be appreciated that the geofence may be represented using any suitable geofence data depending on the particular embodiment. For example, in some embodiments, the geofence may be represented based on a plurality of geographical coordinates that, when connected, represent or depict a polygonal geofence. In other embodiments, the geofence data may include or represent one or more radii and/or arcuate portions that define or help to define the geofence. As such, the mobile device 102 may compare its current location to the locations of the geofence in order to determine its location relative to the geofence (e.g., inside the borders, outside the borders, at the border, etc.). Although the technologies are described herein primarily with respect to a single geofence, it should be appreciated that the airport/facility may include multiple geofences and/or sub-geofences in other embodiments.

If the mobile device 102 determines, in block 404, that the geofence has been crossed, the method 400 advances to block 406 in which the mobile device 102 (e.g., via the TNC application 114) notifies the TNC system 108 that the mobile device 102 has crossed the geofence (e.g., by entering the geofence from outside the geofence, or exiting the geofence from within the geofence). It should be appreciated that the entry/exit across the geofence may be represented in any suitable data format for performing the functions described herein. Similarly, the data may be transmitted from the mobile device 102 to the TNC system 108 using any suitable technologies and/or protocols.

In block 408, the TNC system 108 transmits an activity message to the management system 106 indicative of the entry/exit across the geofence (e.g., via a cloud-based API). In block 410, the management system 106 validates and processes the message received from the TNC system 108. For example, in some embodiments, the management system 106 may verify a security credential associated with the TNC system 108, validate the activity message, transfer the data from the activity message to an eventing system, queue the data for processing, receive the data from the queue, and parse the data.

In block 412, the management system 106 determines whether the mobile device 102 is a new mobile device to the management system 106. In other words, the management system 106 determines whether it has previously stored data associated with the mobile device 102 (e.g., whether the management system 106 has information regarding that particular TNC operator operating within its geofence). If the mobile device 102 is new, the method 400 advances to block 414 in which the management system 106 adds the mobile device 102 or an identifier thereof to a database stored on the management system 106. In other words, in some embodiments, the management system 106 is able to automatically register each new vehicle (e.g., based on the associated mobile device 102) without any manual data entry by airport/facility administrative users (e.g., eliminating potential face-to-face or interpersonal interaction with each TNC driver).

In block 416, the management system 106 stores the entry/exit event and/or other relevant data (e.g., in association with the mobile device 102 that prompted generation of the event). Although the techniques are described herein primarily in references to entry/exit events, it should be appreciated that they may be applied in reference to other types of events in other embodiments as well (e.g., drop-off, pick-up, etc.). It should be further appreciated that the recorded data may be used to validate fees paid by the TNCs based on an analysis of reported trips using reports, tables, grids, and/or raw database transactions permitted by the management system 106.

Although the blocks 402-416 are described in a relatively serial manner, it should be appreciated that various blocks of the method 400 may be performed in parallel in some embodiments.

Figure 5:
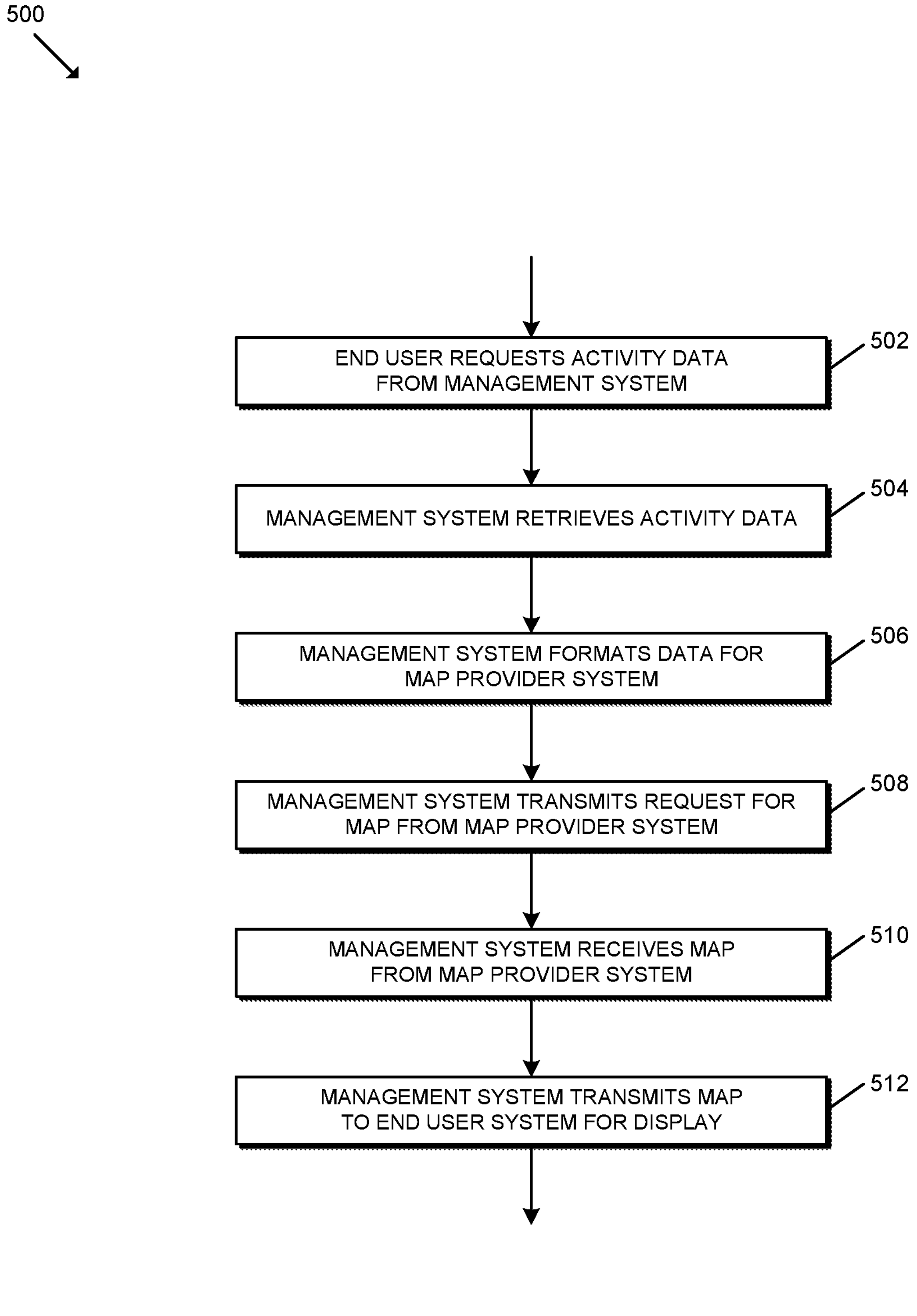
FIG. 5 is a simplified flow diagram of at least one embodiment of a method for requesting a visual representation of activity data.

Referring now to FIG. 5, the system 100 may execute a method 500 for requesting a visual representation of activity data. It should be appreciated that the particular blocks of the method 500 are illustrated by way of example, and such blocks may be combined or divided, added or removed, and/or reordered in whole or in part depending on the particular embodiment, unless stated to the contrary.

The illustrative method 500 begins with block 502 in which the end user (e.g., an airport administrative user) requests activity data (e.g., via the end user system 112) from the management system 106 or, more specifically, a visual representation of such activity data. In block 504, the management system 106 retrieves the activity data (e.g., from a database of the management system 106). In block 506, the management system 106 formats the activity data for the map provider system 110 and, in block 508, the management system 106 transmits a request for a map indicative of the activity data from the map provider system 110. The map provider system 110 generates a map based on the activity data and the request from the management system 106 and, in block 510, the map is transmitted to the management system 106. In block 512, the management system 106 transmits the map to the end user system 112 such that it can be displayed to the end user.

It should be appreciated that the particular activity data may vary depending on the particular embodiment and, therefore, the particular map may vary. For example, in some embodiments, the map may be embodied as a single image that depicts the location of one or more mobile devices 102 at a particular point in time (e.g., in real time, or a past time). In other embodiments, the map may be embodied as a series of images or a video that depicts the location of one or more mobile devices 102 at various points in time. For example, in some embodiments, the map depicting one or more mobile devices 102 relative to the geofence may be periodically transmitted to the end user system 112 to allow a real-time (or near real-time) depiction of the locations of those mobile devices 102. In other embodiments, the map may depict the locations of a particular mobile device 102 over some period of time in the past (e.g., between a point in time at which the mobile device 102 entered the geofence and a point in time at which the mobile device 102 exited the geofence).

Although the blocks 502-512 are described in a relatively serial manner, it should be appreciated that various blocks of the method 500 may be performed in parallel in some embodiments.

As described herein, it should be appreciated that a particular TNC system 108 may transmit an entry, exit, pickup, and/or drop-off event to the management system 106 (e.g., of an airport) associated with a mobile device 102 (e.g., of a TNC operator), and the data may be recorded with other ground transportation data, thereby allowing the management system 106 to charge, report, and/or audit information as needed. In some embodiments, the messages for a particular TNC may be transmitted to a URL (or other electronic address) specific to that particular TNC. By way of example, in some embodiments, the data exchange may be accomplished using an HTTPS POST message containing a JSON data packet as described in reference to FIGS. 6-7.

In particular, the message may include a request header similar to the request header 600 of FIG. 6. As shown, the request header 600 includes "POST/HTTPS/1.1" with "Content-Type: application/j son", "Authorization: Basic [credential]", and "Content-Length: 208." It should be appreciated that the username and password contained in the request header may follow HTTP standards of two values separated by a colon and Base64 encoded, and the credential may vary by airport/entity.

Further, the message may include a request body similar to the request body 700 of FIG. 7. As shown, the illustrative request body 700 includes a "uid" value indicating a unique identifier for a TNC driver/operator associated with a particular mobile device 102, a "timestamp" value indicating the time that a particular event occurred, a "lon" value indicating a longitudinal coordinate at which the event occurred, a "lat" value indicating a latitudinal coordinate at which the event occurred, a "license_plate" value indicating a vehicle license plate of the vehicle used by the TNC driver/operator, a "tnc_id" value indicating a unique number associated with the TNC, a "txn_type" value indicating the type of event specific to the geofence referenced by the message (e.g., INBOUND_DROP-OFF indicating that a trip is accepted that concludes with a passenger drop off at one of the airport drop off areas, INBOUND_PICK-UP indicating that a trip is accepted that requires the pickup of a passenger at one of the airport pickup areas, ENTRY indicating entry into the geofence, EXIT indicating exit from the geofence, PICK-UP indicating pickup of a passenger, DROP-OFF indicating drop-off of a passenger, etc), a "ride_count" value indicating whether a passenger is in the vehicle or not, and a "geofence_id" value indicating a unique identifier for the particular geofence at the facility/airport. It should be appreciated that the request body may vary by including additional, fewer, and/or alternative data in other embodiments.

It should be appreciated that, in some embodiments, the management system 106 may transmit a predefined response to the TCN system 108 depending on the particular context and/or processing of the request. For example, in some embodiments, the management system 106 may return an HTTP 200 response if a valid message was successfully processed, an HTTP 401 response if a message with an incorrect username/password was received, or an HTTP 400 response if the message processing failed (e.g., due to no receipt of the message or a processing error). In some embodiments, all messages that do not receive an HTTP 200 response may be buffered (e.g., and error corrected) and transmission may be re-attempted until an HTTP 200 response has been received or a timeout or error handling has occurred.

It should be appreciated that the techniques described herein allow the system 100 to securely store and protect data (preventing unauthorized access), enhance the ability for user to view TNC activity using map/satellite views, enhance the ability for users to quickly view data, and/or efficiently store, access, and view many (e.g., millions of) messages received from TNCs and/or TNC operators for each facility/airport.

In some embodiments, the system 100 may allow for notification of alert conditions via email and/or SMS. For example, the system 100 may generate alert messages if messages are not being received from one or more TNCs (e.g., via the respective TNC systems 108), the system 100 is not functioning properly, a hot list hit by driver identification and/or license plate number, a TNC message validation error, a message buffering condition, and/or another type of alert message. The alert message indicating that message are not being received from a particular TNC may vary depending on the particular TNC due, for example, to differing expected message intervals for the particular TNC system 108. In other words, each of the TNC systems 108 may have a different interval at which activity messages are transmitted to the management system 106 (e.g., based on the volume of TNC operators operating within the particular geofence(s) for that TNC).

It should be appreciated that the system 100 may include "hot list" functionality that provides a mechanism for users to place TNC operators on one or more "hot lists" or "watch lists." In some embodiments, when on a hot list, one or more activities performed by the TNC operator may generate an alert to the end user. For example, in some embodiments, the end user may be alerted any time a TNC operator on a particular hot list enters a geofence associated with the airport (e.g., triggering an INBOUND_PICK-UP event). In another embodiment, the end user may be alerted any time a TNC operator on a particular hot list remains idle (i.e., non-moving) for at least a threshold period of time (e.g., indicating potential unauthorized or unwanted activity by the airport administrator). In some cases, the system 100 may even be configured such that the end user is alerted when a TNC operator is idle irrespective of whether the TCN operator is on a hot list. In some embodiments, a hot list component of the system 100 may receive real-time data from the eventing pipeline, compare the activity to the TNC operators on the hot list, and transmit SMTP and/or SMS alert notifications about the operator and current location to an end user (e.g., at the end user system 112). In some embodiments, the management system 106 may include a violation recording function to track driver activities and impose consequences (e.g., tracking the number/type of warnings/interactions that a particular TNC operator has had from airport/facility staff).

It should be appreciated that a hot list may be generated by the management system 106 for any purpose deemed appropriate by the end user. For example, in many cases, violations of airport regulations (physical altercations involving the TNC operator, failure to pay by the TNC operator, pick-up of a passenger from an unauthorized location by a TNC operator, etc.) may result in the user being placed on a hot list. In some embodiments, the management system 106 may monitor one or more criteria/conditions to determine whether a TNC operator should be added to a hot list and, if satisfied, automatically add the TNC operator to the hot list. For example, in an embodiment, after a particular TNC operator picks up a threshold number of passengers outside of an authorized pickup area, the management system 106 may automatically add the user to a corresponding hot list. Further, in some embodiments, the end user may manually add one or more users to a hot list (e.g., after being flagged for review/consideration by the management system 106). It should be appreciated that the hot list provides the airport operator with the ability to quickly and efficiently locate, track, and intercept a TNC operator's vehicle that is on a hot list if desired (e.g., to remove the vehicle from the premises).

As described herein, the system 100 may allow for the ability to view TNC operator activity in a map/satellite view. For example, possible views may include viewing currently on-premises vehicles (e.g., based on the locations of the respective mobile devices 102), viewing the vehicle location at a particular point in time (e.g., filtered by account and/or type of TNC message), viewing the locations at which the TNC messages occurred by a time range (e.g., filtered by account and/or type of TNC message), viewing "exception" messages that occurred outside of a designated area (e.g., PICK-UP messages), and/or other types of views. Further, in some embodiments, the system 100 may allow for the ability to replay a period of time in the map/satellite view to monitor the movement of TNC operators (e.g., via the respective locations of the various mobile devices 102) within and around the geofenced areas as time progressed. In some embodiments, in addition to allowing the user to view information in a map/satellite view, the system 100 may also provide data that can be filtered including TNC messages by airport/facility, TNC, and date/time range (e.g., with number of type of message, summary, etc.), charges by airport/facility, TNC, and date/time range (e.g., with group by vehicle, summary, etc.), log by airport/facility and date/time, and/or other relevant data. It should be appreciated that, depending on the particular embodiment, the system 100 may allow for a real-time and/or historical view of the TNC operator activity in a map/satellite view (e.g., aerial view). It should be appreciated that replay of an event stream would allow the end user to see pinch points, peak hours of activity, perform accident investigations, and/or otherwise assess the flow of TNC operators at the airport/facility. For example, if there is backed up traffic at 5 pm on a particular day, the end user could replay an event stream associated with that time frame to view the TNC operator movements and activity in the area at the time to determine the cause. It should be appreciated that the playback speed may vary depending on the particular embodiment and, in some embodiments, may be varied based on user input. Further, in some embodiments, it should be appreciated that the management system 106 may leverage one or more artificial intelligence and/or machine learning algorithms to analyze historical data and/or real-time data to identify the cause of one or more events (e.g., backed up traffic, etc.).

In some embodiments, in order to view currently on-premises vehicles, the database is queried for all event data that indicates a vehicle (e.g., a TNC operator identified based, for example, on the associated mobile device 102) is currently on-premises. The spatial data for each vehicle found to be on-premises may be added to a JSON object and transmitted to the map provider system 110. The map provider system 110 may geolocate the coordinate points on a map/satellite view and forward the relevant maps/views to the end user system 112 for display to the user.

In some embodiments, in order to view a vehicle location at a particular point in time, the system 100 may allow (e.g., via the end user system 112) for the user to select a particular date/time, TNC account, specific vehicle (e.g., TNC operator, mobile device 102, etc.), and/or a type of event. The database may be queried for matching event data. The spatial data found may be added to a JSON object and transmitted to the map provider system 110. Again, the map provider system 110 may geolocate the coordinate points on a map/satellite view and forward the relevant maps/views to the end user system 112 for display to the user. For example, in an embodiment, the end user (e.g., an airport administrative user) may want to retrieve a historical visual depiction (e.g., in an aerial map view) of the location of a particular vehicle at a certain time (e.g., 4:00 pm) on a certain day (e.g., Oct. 20, 2020). Further, in some embodiments, the end user may retrieve a series of images and/or video including relevant maps/views depicting a particular vehicle over a period of time (e.g., from 4:00 pm to 6:00 pm on Oct. 20, 2020).

In some embodiments, in order to view locations at which TNC message occurred, the system 100 may allow (e.g., via the end user system 112) for the user to select a particular date/time range, TNC account, and/or type of event. The database may be queried for matching event data. The spatial data found may be added to a JSON object and transmitted to the map provider system 110, and the map provider system 110 may geolocate the coordinate points on a map/satellite view and forward the relevant maps/views to the end user system 112 for display to the user.

In some embodiments, in order to view "exception" messages that occurred outside of a designated area, the system 100 may allow (e.g., via the end user system 112) for the user to select a particular date/time range, TNC account, type of event, and/or geographic area (e.g., by drawing a polygon or other shape on a map). The database may be queried for matching event data that occurred outside of the user-defined polygon/shape. The spatial data found may be added to a JSON object and transmitted to the map provider system 110, and the map provider system 110 may geolocate the coordinate points on a map/satellite view and forward the relevant maps/views to the end user system 112 for display to the user.

Similar techniques to those described above may be used to provide a visual representation of spatial data by time (e.g., to spot trends not easily identified through tabular/textual analysis of data). For example, activity data stored in a relational database may include the TNC account, TNC operator, type of event, date/time the event occurred, latitude/longitude coordinates, and/or other details associated with the activity/event as described above. After the user has selected the desired filters, the database is queried for matching event data as described above. For each time interval within the desired time range, the spatial data from each activity event may be added to a JSON object and transmitted to the map provider system 110. The map provider system 110 may geolocate the coordinate points on a map/satellite view and forward the relevant maps/views to the end user system 112 for display to the user. In some embodiments, each type of activity event may be displayed in a different color. Further, the user may animate the timeline or step through the timeline by a selected time interval, and/or play the timeline to cause each time interval to be displayed for a short period of time before automatically stepping to the next interval. In some embodiments, the maps/views may distinguish vehicles associated with different TNCs with different icons, graphics, colors, or other indicia—for example, by displaying a vehicle associated with a first TNC (e.g., Uber) differently from a vehicle associated with a second TNC (e.g., Lyft).

It should be appreciated that the management system 106 and/or other portions of the system 100 may leverage one or more machine learning techniques to perform the analyses and/or other functions described herein. For example, in some embodiments, the management system 106 may utilize one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, and/or other suitable machine learning algorithms, techniques, and/or mechanisms. In particular, in some embodiments, the management system 106 may leverage artificial intelligence and/or machine learning techniques to determine the cause of one or more events as described above. Further, it should be appreciated that the management system 106 receives and analyzes a large amount of data received from the TNC system 108, the map provider system 110, and/or other portions of the system 100—any portion of which may be analyzed using artificial intelligence and/or machine learning techniques, for example, in order to determine trends or patterns in the data, causes of various events, and/or other useful information. In yet another embodiment, the management system 106 may provide an automated utility that reconciles any differences in reported activity from a TNC company with the actual vehicle/operator activity.

What is claimed is:

1. A method for activity monitoring of transportation network company vehicles within a geofence associated with an airport, the method comprising:

detecting a mobile device associated with a vehicle operator comprising a smart phone running one or more applications through which monitoring of the vehicle within the geofence takes place;

receiving a user selection of a past time interval representing a timeline from a first point in time to a later second point in time, and an event type within the geofence to be monitored;

querying a database for event data that matches the user selection of the past time interval and the event type;

generating a JSON (JavaScript Object Notation) object that includes spatial data for each event identified as a result of querying the database; and animating a visual representation of the spatial data for each event in a map view by automatically moving through from the first point in time to the second point in time over the timeline associated with the past time interval.

2. The method of claim 1, wherein receiving the user selection of the past time interval and the event type within the geofence to be monitored comprises receiving the user selection of a past time interval and a plurality of event types within the geofence to be monitored; and wherein querying the database for event data that matches the user selection of the past time interval and the event type comprises querying the database for event data that matches the user selection of the past time interval and at least one of the plurality of event types.

3. The method of claim 1, wherein the event data indicates that a vehicle is currently on premises within the geofence.

4. The method of claim 1, wherein the visual representation comprises a video that displays the spatial data for each event in the map view over the timeline.

5. The method of claim 1, further comprising:

monitoring for events associated with a transportation network company vehicle; and generating an alert message in response to identifying one or more events associated with the transportation network company vehicle being on premises within the geofence.

6. The method of claim 1, further comprising:

monitoring a geographical location of a transportation network company vehicle within the geofence; and generating an alert message in response to determine that the transportation network company vehicle has remained in the same geographical location for at least a threshold period of time.

7. The method of claim 1, wherein the event type comprises one of an entry event, an exit event, a pickup event, or a drop-off event.

8. The method of claim 1 further comprising multiple transportation network companies, and the event and spatial data is generated for each such company.

9. The method of claim 8 where an alert message are generated if one or more of the transportation companies has not responded to messages within a period of time that indicates that a system of one or more of the companies is not functioning properly.

10. The method of claim 8 where the user is communicating with multiple transportation network companies.

11. The method of claim 1 where the method operates on multiple geofences associated with an airport.

12. The method of claim 1 further comprising the step of drawing a map representing a portion of the geofence and identifying an event that occurs outside the geofence.

13. The method of claim 1 where the method operates on a geofence associated with an airport comprised of multiple sub-geofences.

14. The method of claim 1 comprising the step of filtering the animated visual representation of the spatial data to a subset of event data.

15. The method of claim 14 where the filtering comprises filtering based on one or more of account, type of message, exception messages, event type, provider, or vehicle identification.

16. The method of claim 1 where new vehicles can be registered automatically based on the mobile device of the vehicle operator.

17. A system for activity monitoring of transportation network company vehicles within a geofence associated with an airport, the system comprising:

at least one processor; and at least one memory having a plurality of instructions stored thereon that, in response to execution by the at least one processor, causes the system to:

receive a user selection of a past time interval representing a timeline from a first point in time to a later second point in time, and an event type within the geofence to be monitored;

query a database for event data that matches the user selection of the past time interval and the event type;

generate a JSON (JavaScript Object Notation) object that includes spatial data for each event identified as a result of querying the database; and animate a visual representation of the spatial data for each event in a map view by automatically moving through from the first point in time to the second point in time over the timeline associated with the past time interval.

18. The system of claim 17, wherein to receive the user selection of the past time interval and the event type within the geofence to be monitored comprises to receive the user selection of a past time interval and a plurality of event types within the geofence to be monitored; and wherein to query the database for event data that matches the user selection of the past time interval and the event type comprises to query the database for event data that matches the user selection of the past time interval and at least one of the plurality of event types.

19. The system of claim 17, wherein the event data indicates that a vehicle is currently on premises within the geofence.

20. The system of claim 17, wherein the visual representation comprises a video that displays the spatial data for each event in the map view over the timeline.

21. The system of claim 17, wherein the plurality of instructions further causes the system to:

monitor for events associated with a transportation network company vehicle; and generate an alert message in response to identifying one or more events associated with the transportation network company vehicle being on premises within the geofence.

22. The system of claim 17, wherein the plurality of instructions further causes the system to:

monitor a geographical location of a transportation network company vehicle within the geofence; and generate an alert message in response to determine that the transportation network company vehicle has remained in the same geographical location for at least a threshold period of time.

23. The system of claim 17, wherein the event type comprises one of an entry event, an exit event, a pickup event, or a drop-off event.

24. A method for activity monitoring of transportation network company vehicles within a geofence associated with an airport, the method comprising:

detecting a mobile device of a vehicle the activity of which are associated with one or more event types;

receiving a user selection of a past time interval representing a timeline from a first point in time to a later second point in time, and the event type within the geofence to be monitored;

querying a database for event data that matches the user selection of the past time interval and the event type;

generating a JSON (JavaScript Object Notation) object that includes spatial data for each event identified as a result of querying the database; and animating a visual representation of the spatial data for each event in a map view by automatically moving through from the first point in time to the second point in time over the timeline associated with the past time interval.

25. One or more non-transitory machine-readable storage medium comprising a plurality of instructions stored thereon that, in response to execution by at least one processor, causes a system to:

detect a mobile device associated with a vehicle operator comprising a smart phone running one or more applications through which monitoring of the vehicle within the geofence takes place;

receive a user selection of a past time interval representing a timeline from a first point in time to a later second point in time, and an event type within the geofence to be monitored;

query a database for event data that matches the user selection of the past time interval and the event type;

generate a JSON (JavaScript Object Notation) object that includes spatial data for each event identified as a result of querying the database; and animate a visual representation of the spatial data for each event in a map view by automatically moving through from the first point in time to the second point in time over the timeline associated with the past time interval.

26. The one or more non-transitory machine-readable storage medium of claim 25, wherein to receive the user selection of the past time interval and the event type within the geofence to be monitored comprises to receive the user selection of a past time interval and a plurality of event types within the geofence to be monitored; and where in to query the database for event data that matches the user selection of the past time interval and the event type comprises to query the database for event data that matches the user selection of the past time interval and at least one of the plurality of event types.

27. The one or more non-transitory machine-readable storage medium of claim 25, wherein the event data indicates that a vehicle is currently on premises within the geofence.

28. The one or more non-transitory machine-readable storage medium of claim 25, wherein the event type comprises one of an entry event, an exit event, a pickup event, or a drop-off event.

29. The one or more non-transitory machine-readable storage medium of claim 25, wherein the event type comprises one of an entry event, an exit event, a pickup event, or a drop-off event.

30. The method of claim 24 where new vehicles can be registered automatically based on a mobile device of the vehicle operator.

31. The method of claim 24 further comprising the step of screening the vehicle against a hot/watch list.

32. The method of claim 31 further comprising the step of notifying the user if the vehicle is on the hot/watch list indicating a warning condition.

33. The method of claim 32 where the warning indicated that the vehicle is not allowed to operate in the airport.

* * * * *